(12) United States Patent
Gonin

(10) Patent No.: US 8,215,705 B2
(45) Date of Patent: Jul. 10, 2012

(54) SHOCK-ABSORBER ASSEMBLY AND CORRESPONDING MOTOR VEHICLE

(75) Inventor: Vincent Gonin, Sochaux (FR)

(73) Assignee: Faurecia Bloc Avant, Nanterre (FR)

( * ) Notice: Subject to any disclaimer, the term of this patent is extended or adjusted under 35 U.S.C. 154(b) by 359 days.

(21) Appl. No.: 12/486,219

(22) Filed: Jun. 17, 2009

(65) Prior Publication Data

US 2009/0315343 A1    Dec. 24, 2009

(30) Foreign Application Priority Data

Jun. 18, 2008   (FR) ...................................... 08 54026

(51) Int. Cl.
*B60R 19/02* (2006.01)
(52) U.S. Cl. .................................. 296/187.09
(58) Field of Classification Search ............. 293/193.09, 293/102, 132, 122, 120, 142, 143, 144; 296/187.03, 296/187.04, 187.09
See application file for complete search history.

(56) References Cited

U.S. PATENT DOCUMENTS

| | | | | |
|---|---|---|---|---|
| 3,819,224 A * | 6/1974 | Casey et al. | ............. | 296/187.09 |
| 5,853,195 A * | 12/1998 | Le et al. | .................... | 280/784 |
| 6,733,055 B2 * | 5/2004 | Iino | ................ | 293/142 |
| 6,851,731 B2 * | 2/2005 | Janssen | ......................... | 293/102 |
| 6,908,130 B2 * | 6/2005 | Reutlinger et al. | ............ | 293/155 |
| 7,192,067 B2 * | 3/2007 | Hansen | ........................ | 293/133 |
| 7,681,700 B2 * | 3/2010 | Ginja et al. | .................... | 188/377 |
| 7,681,943 B2 * | 3/2010 | Murata et al. | ............ | 296/203.02 |
| 2003/0075951 A1 * | 4/2003 | Hanakawa et al. | ........... | 296/188 |
| 2005/0046226 A1 | 3/2005 | White | | |

FOREIGN PATENT DOCUMENTS

| | | |
|---|---|---|
| DE | 102006041095 | 3/2008 |
| EP | 1293389 | 3/2003 |
| FR | 2875771 | 3/2006 |
| FR | 2896222 | 7/2007 |
| WO | 2006035150 | 4/2006 |
| WO | 2007011238 | 1/2007 |

OTHER PUBLICATIONS

Priority Search Report dated Feb. 10, 2009, in French priority application.

* cited by examiner

*Primary Examiner* — Glenn Dayoan
*Assistant Examiner* — Pinel Romain
(74) *Attorney, Agent, or Firm* — Young & Thompson

(57) ABSTRACT

A front shock-absorber assembly for a motor vehicle includes, at each of the right-hand and left-hand sides thereof, at least a lower longitudinal structural element (6, 7) and an upper longitudinal structural element (4, 5). The shock-absorber assembly includes a high-energy impact absorption structure (12) which includes an elongate right-hand plate (18) and left-hand plate (19), each plate being fixedly joined to a lower longitudinal element and an upper longitudinal element located at the same side of the vehicle; and a deformable right-hand element (30) and left-hand element (31) for absorbing medium-energy impacts, a rear surface of a deformable element moving into abutment against the majority of a front surface of an associated plate.

12 Claims, 2 Drawing Sheets

SHOCK-ABSORBER ASSEMBLY AND CORRESPONDING MOTOR VEHICLE

BACKGROUND OF THE INVENTION

The present invention relates to a shock-absorber assembly for a motor vehicle comprising, at each of the right-hand and left-hand sides thereof, at least a cradle extension end and a side sill end.

Such a shock-absorber assembly is known, for example, from document US 2005/0046226 A1. The shock-absorber assembly comprises a lower transverse beam which connects the ends of the cradle extensions and an upper transverse beam which connects the ends of the extensions of the side sills. Furthermore, the shock-absorber assembly comprises a deformable energy absorption element which is interposed between the two rigid structures which are, on the one hand, the beam and, on the other hand, a cradle extension or a side sill.

Motor vehicles must comply with various standards relating to impacts. The shock-absorber must be capable of absorbing the significant level of energy released during an impact at high speed (64 km/h) in order to protect the occupants of the vehicle. Furthermore, the shock-absorber must perform this function in the event of an impact with another motor vehicle which has a gauge which is different from the gauge of the vehicle in question.

In the known shock-absorber assembly, the presence of the transverse beams allows cohesion to be maintained between the left-hand and right-hand portions of the vehicle body during a high-speed impact. However, it does not allow the cohesion of the body to be maintained during an axial impact at high speed between vehicles which have different gauges and/or during a corner impact. During such impacts, a deformable element works laterally, for which it is not designed. Consequently, the lateral beams are torn from the body of the vehicle.

Furthermore, since a radiator is located behind the transverse beams, when the deformable elements are crushed along the thickness thereof, the transverse beams come into contact with the radiator and damage it.

The object of the invention is to overcome this problem by providing an improved shock-absorber assembly.

SUMMARY OF THE INVENTION

To this end, the invention relates to a front shock-absorber assembly for a motor vehicle comprising, at each of the right-hand and left-hand sides thereof, at least a lower longitudinal structural element and an upper longitudinal structural element. The shock-absorber assembly comprises a high-energy impact-absorbing structure which comprises an elongate right-hand and an elongate left-hand plate, each plate being fixedly joined to a lower longitudinal element and an upper longitudinal element located at the same side of the vehicle; and a deformable right-hand and left-hand element for absorbing medium-energy impacts, a rear surface of a deformable element moving being in abutment against the majority of a front surface of an associated plate.

According to specific embodiments of the invention, the shock-absorber assembly comprises one or more of the following features, taken in isolation or according to any technically possible combination:

it comprises a framework for absorbing low-energy impacts, the framework being fixed to the structure so that, in the event of an impact, a rear surface of the framework moves into abutment against a front surface of the deformable elements;

since the vehicle comprises additional right-hand and left-hand longitudinal elements, each of the right-hand plate and left-hand plate is fixedly joined to the front ends, located at the same side of the vehicle, of a lower longitudinal element, an upper longitudinal element and an additional longitudinal element;

the high-energy impact absorption structure comprises at least a transverse beam which is fixed to the right-hand plate and left-hand plate;

the transverse beam is fixed to the rear surfaces of the right-hand plate and left-hand plate, between the plate and the end of a lower longitudinal element, an upper longitudinal element or an additional longitudinal element;

a deformable energy absorption element is constituted by the superposition of a plurality of elementary energy absorption units;

a rear surface of a deformable element has at least one recess for receiving the at least one transverse beam, the beam being fixed to the front surface of the plate;

a rear surface of the framework has right-hand and left-hand housings which are capable of receiving a deformable element;

the framework comprises means for supporting at least one component among a body component, a front face accessory and a shock-absorber skin, the support means being capable of fixing the at least one component to the framework in a removable manner;

the lower longitudinal structural element is a cradle extension and the upper longitudinal structural element is a side sill.

The invention also relates to a motor vehicle whose front face is provided with a shock-absorber assembly as described above.

BRIEF DESCRIPTION OF THE DRAWINGS

The invention and the advantages thereof will be better understood from a reading of the following description, given purely by way of example and with reference to the appended drawings, in which.

DETAILED DESCRIPTION OF THE PREFERRED EMBODIMENTS

Figure 1:
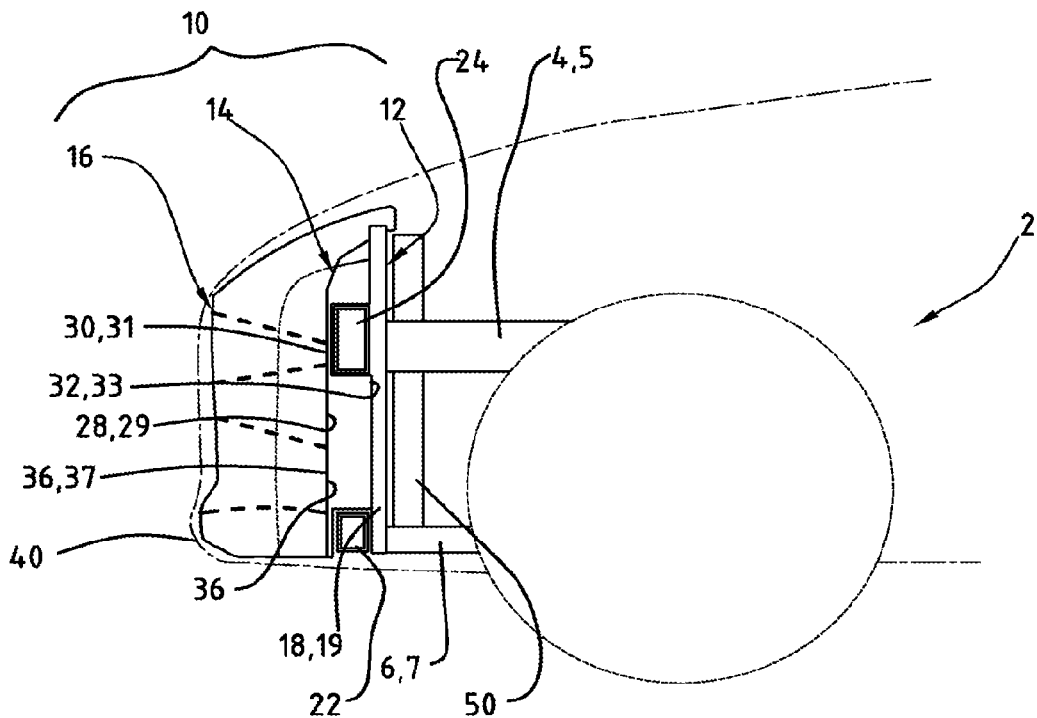
FIG. 1 is a section, in a vertical plane containing the longitudinal axis of the vehicle, of a front face which is provided with a shock-absorber assembly according to a first embodiment.

With reference to FIG. 1, a front face of a motor vehicle 2 comprises, in the upper portion thereof, a right-hand side sill 4 and a left-hand side sill 5 and, in the lower portion thereof, a right-hand cradle extension 6 and a left-hand cradle extension 7.

The shock-absorber element 10 with which the front face of the vehicle 2 is provided is fixedly joined to the side sills 4 and 5 and the cradle extensions 6 and 7. The shock-absorber element 10 comprises, successively from the rear to the front along the longitudinal axis X of the vehicle 2, a high-energy impact-absorption structure 12, an intermediate-energy impact absorption means 14, and a low-energy impact absorption framework 16.

The high-energy impact absorption structure 12 comprises two plates, a right-hand plate 18 and a left-hand plate 19. The right-hand plate 18 is rigid and is, for example, constituted by a metal plate of aluminium or steel having a substantially rectangular shape. The right-hand plate 18, which is arranged substantially vertically, connects the end of the right-hand side sill 4 and the end of the right-hand cradle extension 6. The right-hand plate 18 is fixed directly, by means of screwing or bolting, to flanges which are provided on the end sections of the extensions 4 and 6. The right-hand plate 18 allows the structure of the body to be strengthened at the right-hand side of the vehicle 2. The right-hand plate 18 has a planar, elongate front surface 28.

A similar description can be given for the plate 19 which connects the end of the left-hand side sill 5 and the end of the left-hand cradle extension 7. The left-hand plate 19 allows the structure of the body to be strengthened at the left-hand side of the vehicle 2. The left-hand plate 19 has a planar and elongate front surface 29.

The structure 12 also comprises a lower beam 22 and an upper beam 24 which are arranged parallel with a transverse direction Y of the body of the vehicle 2. The transverse beams 22 and 24 are rigid and produced from metal, for example, in the form of a steel or aluminium profile. A transverse beam 22, 24 is fixed to each of the front surfaces 28 and 29 of the plates 18 and 19. The transverse beams 22 and 24 fix together the right-hand and left-hand sides of the body of the vehicle 2.

It has been found that the rigid and direct connection, with no energy absorption element being interposed, between the cradle extension and the side sill which are located at the same side of the vehicle improves the torsion strength of the body and incidentally improves the road performance of the vehicle. Furthermore, the normal modes of vibration of the body are modified so that the acoustics of the vehicle are improved.

In this manner, in this embodiment, the shock-absorber assembly comprises a single rigid structure. The beams are positioned so as to be offset towards the rear of the vehicle, relative to their position in the front faces in accordance with the prior art. These few millimeters of offset improve the front overhang of the vehicle.

In order to compensate for the increased strength conferred by the structure 12 on the body of the vehicle 2, the shock-absorber element 10 comprises, in front of the plates 18 and 19, an intermediate-energy impact absorption means 14 and a low-energy impact absorption framework 16 in order to comply with the standards relating to impacts, for example, of the "Danner" repairability type or pedestrian impact type. Since these fusible zones are placed at the front of the vehicle, they are readily accessible and replacable following an impact.

The absorption means 14 (referred to as "crash box" in English) comprises two deformable energy absorption elements, a right-hand element 30 and a left-hand element 31, respectively. They are arranged substantially vertically and fixed to an associated plate among plates 18 and 19, respectively. A rear planar surface 32, 33 of a deformable element 30, 31 is in abutment against the majority of the front surface 28, 29 of the associated plate 18, 19. In the event of an impact, a deformable element 30, 31 is intended to be crushed along the thickness thereof, absorbing a fraction of the energy of the impact, whilst distributing the forces over the structure 12.

A deformable element 30, 31 may advantageously have a reduced strength per surface unit since the abutment surface provided by the plates 18 and 19 is large.

Preferably, a deformable energy absorption element 30, 31 is produced by means of superimposing, in a vertical direction Z, a plurality of elementary energy absorption units. These elementary units are, for example, formed by a metal casing whose inner space contains a material in the form of a metal honeycomb, an aluminium foam, a polymer honeycomb, a material which is structured in chambers which are reinforced with ribs, an expanded thermoplastic material, etc.

The framework 16 is obtained by injection-moulding of a thermoplastic polymer material. It has a chambered or ribbed structure so as to confer a degree of strength thereon.

The framework 16 is placed against the right-hand deformable energy absorption element 30 and left-hand deformable energy absorption element 31, and fixed to the metal structure 12. More precisely, the framework 16 is held in position against the transverse beams 22 and 24 and/or against the plates 18 and 19, using fixing means. Preferably, these fixing means are of the type which can be clipped so as to securely hold the framework 16 whilst affording the possibility of disassembling it easily, for example, in order to replace it following a low-speed impact. In a variant, these fixing means are of the screw/nut type.

The rear face 36 of the framework 16 has right-hand and left-hand housings in which a front portion of the right-hand deformable element 30 and left-hand deformable element 31 are inserted. The framework 16 thus overlaps the deformable elements 30 and 31 so that, during an impact, the rear surface 36 of the framework 16 moves into abutment against the front surfaces 34 and 35 of the deformable elements 30 and 31. It should be noted that, since the deformable energy absorption elements are placed in housings, it is not necessary for them to comprise an outer metal casing. In this instance, the housing is filled directly with a material, for example, in the form of a polymer honeycomb.

The framework 16 corresponds to the outer surface of vehicle 2. The framework 16 carries various components 40. This may be, for example, a bodywork component, a front face accessory (lights, radiator grill, etc.), a shock-absorber skin, etc.

It should be noted that a radiator and/or means for producing conditioned air, generally designated by reference 50 in FIG. 1, are provided behind the metal structure 12. The framework 16 has orifices in order to channel a flow of air which is suitable for the correct operation of these items of equipment.

Figure 2:
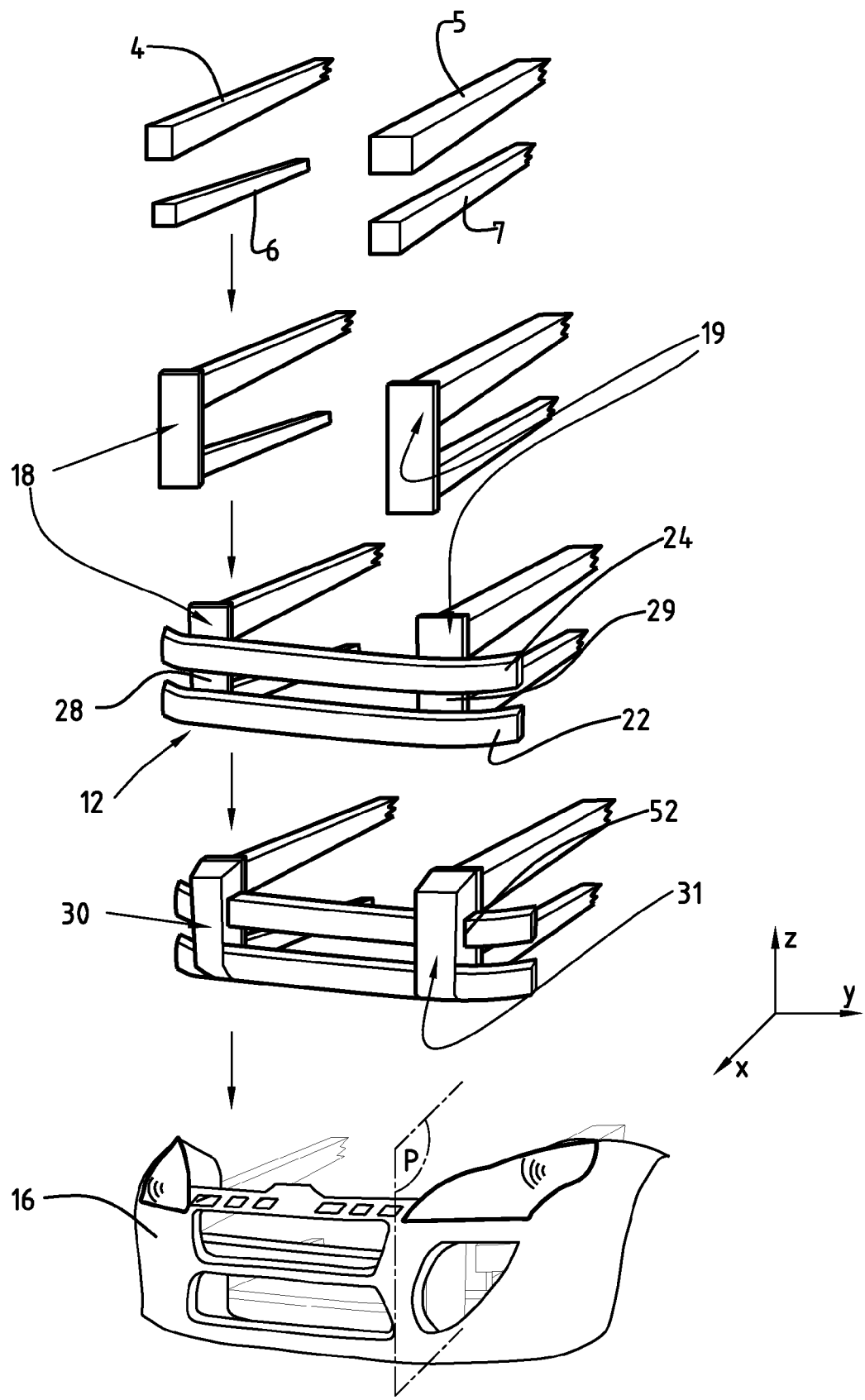
FIG. 2 is a schematic illustration of the various steps for mounting the shock-absorber assembly of FIG. 1; and, FIG. 3 is a section, in a vertical plane containing the longitudinal axis of the vehicle, of a front face which is provided with a shock-absorber assembly according to a second embodiment.

FIG. 2 schematically illustrates the steps for assembling the shock-absorber assembly 10. These assembly steps are successively implemented on an assembly line in order to produce, component by component, the front face of a vehicle, or in order to first produce a pre-assembled module which will then be provided on the assembly line in order to be assembled in a single step on a vehicle. The body of the vehicle 2 has a right-hand cradle extension 6 and left-hand cradle extension 7 and a right-hand side sill 4 and left-hand side sill 5. The right-hand plate 18 and left-hand plate 19 are fixed to the planar end sections of the extensions and the side sills. The plates 18, 19 are arranged substantially vertically, in a substantially transverse plane. Subsequently, the transverse beams 22 and 24 are fixed to the front surface of the elongate plates 18 and 19. In the following step, the deformable elements 30 and 31 are fixed, in a removable manner, to the front surface 28, 29 of the associated plate 18, 19. Recesses 52 which are provided in the rear surface 32, 33 of a deformable element 30, 31 receive the transverse beams 22 and 24. The framework 16 is then fixed to the metal structure 12 after having introduced the deformable elements 30 and 31 into the housings which are provided on the rear surface 36 of the framework 16. Finally, the components and items of equipment 40 are fixed on the outer surface of the framework 16.

Figure 3:
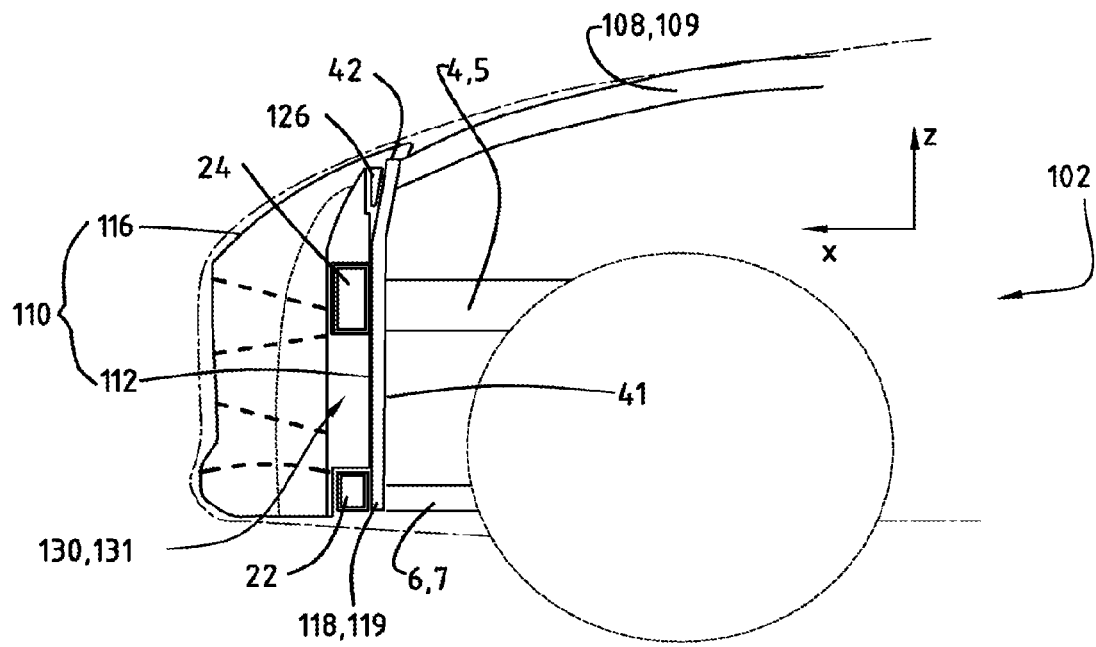

FIG. 3 illustrates a construction variant of the shock-absorber element according to the invention for a vehicle body which, in addition to the cradle extensions 6 and 7 and side sills 4 and 5, has a right-hand elongate wing member 108 and left-hand elongate wing member 109.

In order to strengthen the right-hand and left-hand sides of the front portion of the body of the vehicle 102, the metal high-energy impact absorption structure 112 comprises an elongate right-hand plate 118 and elongate left-hand plate 119. Each plate 118, 119 is fixed to the ends of one cradle extension 6, 7 of one side sill 4, 5 and one elongate wing member 108, 109.

As illustrated in FIG. 3, since the end section of an elongate wing member 108, 109 is located offset from the vertical plane defined by the end cross-sections of the extensions 4, 5 and the side sills 6 and 7, plate 118, 119 comprises a planar lower portion 41 which is arranged vertically and which fixes the ends of the cradle extensions 6, 7 and the side sills 4, 5 and a planar upper portion 42 which is inclined towards the rear and which fixes the ends of a side sill 4, 5 and an elongate wing member 108, 109.

The structure 112, in addition to the lower beam 22 and upper beam 24, comprises a third transverse beam 126 which is located in an upper position, above the upper beam 24. The third beam 126 extends from one plate 118 to the other plate 119 and is fixed substantially at right-angles with respect to the ends of the elongate wing members 108 and 109.

The shock-absorber element 110 has, in front of the elongate plates 118 and 119, a deformable right-hand element 130 and a left-hand element 131 whose rear surfaces are in abutment against the majority of the front surface of the plates 118 and 119, respectively. In particular the deformable element 130, 131 has an upper portion which is capable of moving into abutment against the inclined upper portion of the associated plate 118, 119.

Finally, a framework 116 corresponding to the outer surface of the vehicle is fixed to the metal structure 112, at least partially covering the deformable elements 130 and 131.

Whilst, in the embodiments described, the transverse beams are fixed to the front surface of the plates, in a variant they are fixed to a rear surface of the plates, between the plate and the end of a cradle extension, a side sill or an elongate wing member, so as to be able to work in compression.

The invention claimed is:

1. A front shock-absorber assembly for a motor vehicle that includes vehicle side body members extending in a longitudinal direction of the vehicle, the assembly comprising:
    a high-energy impact absorption structure comprised of:
      a rigid elongate right-hand plate and a rigid elongate left-hand plate,
      a rear face surface of said right-hand plate comprising a lower portion fixedly joined and longitudinally aligned with a right-hand lower vehicle side body member, and an upper portion fixedly joined and longitudinally aligned with a right-hand upper vehicle side body member, and
      a rear face surface of said left-hand plate comprising a lower portion fixedly joined and longitudinally aligned with a left-hand lower vehicle side body member, and an upper portion fixedly joined and longitudinally aligned with a left-hand upper vehicle side body member; and
    left-hand and right-hand deformable elements configured for absorbing medium-energy impacts, the rear face surfaces of said right-hand and left-hand deformable elements being in abutment against at least a majority of, respectively, a front surface of said right-hand plate and a front surface of said left-hand plate.

2. The assembly according to claim 1, further comprising:
    a framework for absorbing low-energy impacts, the framework being fixed to the high-energy impact absorption structure and configured such that, in the event of an impact, a rear surface of the framework moves into abutment against a front surface of the left-hand and right-hand deformable elements.

3. The assembly according to claim 1, wherein said left-hand plate is also fixedly joined to an additional left-hand vehicle side body member located above the left-hand upper vehicle side body member, and said right-hand plate is also fixedly joined to an additional right-hand vehicle side body member located above the right-hand upper vehicle side body member.

4. The assembly according to claim 1, wherein the high-energy impact absorption structure further comprises a transverse beam, transverse to the vehicle side body members, fixed to the right-hand plate and the left-hand plate.

5. The assembly according to claim 4, wherein the transverse beam is fixed to front surfaces of the right-hand plate and the left-hand plate, between the plate and respective ends of the lower vehicle side members and the upper vehicle side members.

6. The assembly according to claim 1, wherein said deformable elements are constituted by a superposition of a plurality of elementary energy absorption units.

7. The assembly according to claim 1, wherein the rear face surfaces of the deformable elements each have at least one recess for receiving a transverse beam, the transverse beam extending transversely with respect to the vehicle side body members and being fixed to the front surfaces of the plates.

8. The assembly according to claim 2, wherein a rear surface of the framework has right-hand and left-hand housings configured to receive the deformable elements.

9. The assembly according to claim 2, wherein the framework comprises support means for supporting at least one component among a body component, a front face accessory, and a shock-absorber skin, the support means being capable of fixing the at least one component to the framework in a removable manner.

10. The assembly according to claim 1, wherein the lower vehicle side body members are cradle extensions and the upper vehicle side body members are side sills.

11. A motor vehicle, comprising a front face provided with a front shock-absorber assembly in accordance with claim 1.

12. The assembly according to claim 2, wherein, said left-hand plate is also fixedly joined to an additional left-hand vehicle side body member located above the left-hand upper vehicle side body member, and said right-hand plate is also fixedly joined to an additional right-hand vehicle side body member located above the right-hand upper vehicle side body member.

* * * * *